Figure 1:
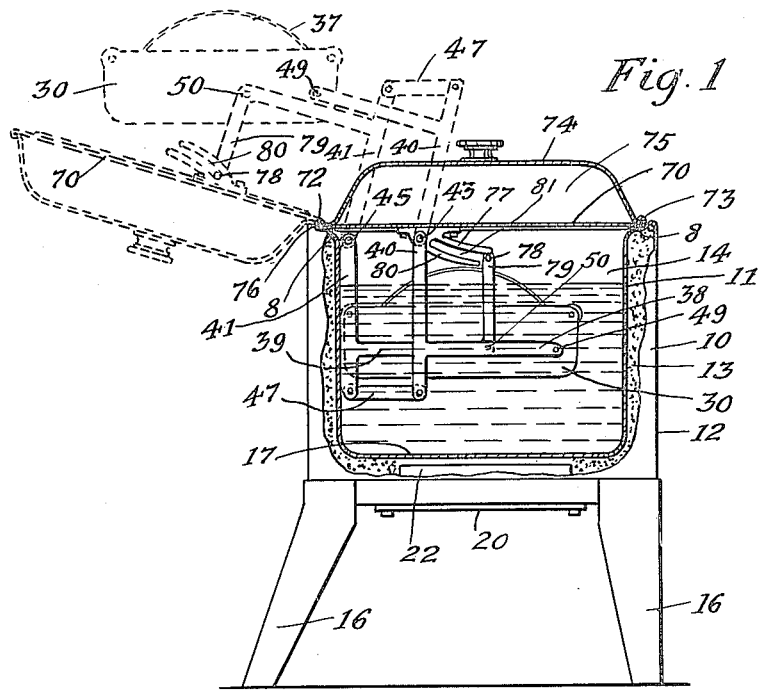

Jan. 1, 1924

J. A. HEIDBRINK

STERILIZER

Filed July 23, 1919

1,479,236

3 Sheets-Sheet 1

Inventor:
Jay A. Heidbrink.
By Whiteley and Ruckman
his Attorneys.

Jan. 1, 1924

J. A. HEIDBRINK

STERILIZER

Filed July 23, 1919

1,479,236

3 Sheets-Sheet 2

Inventor:
Jay A. Heidbrink.
By Whiteley and Ruckman
his Attorneys.

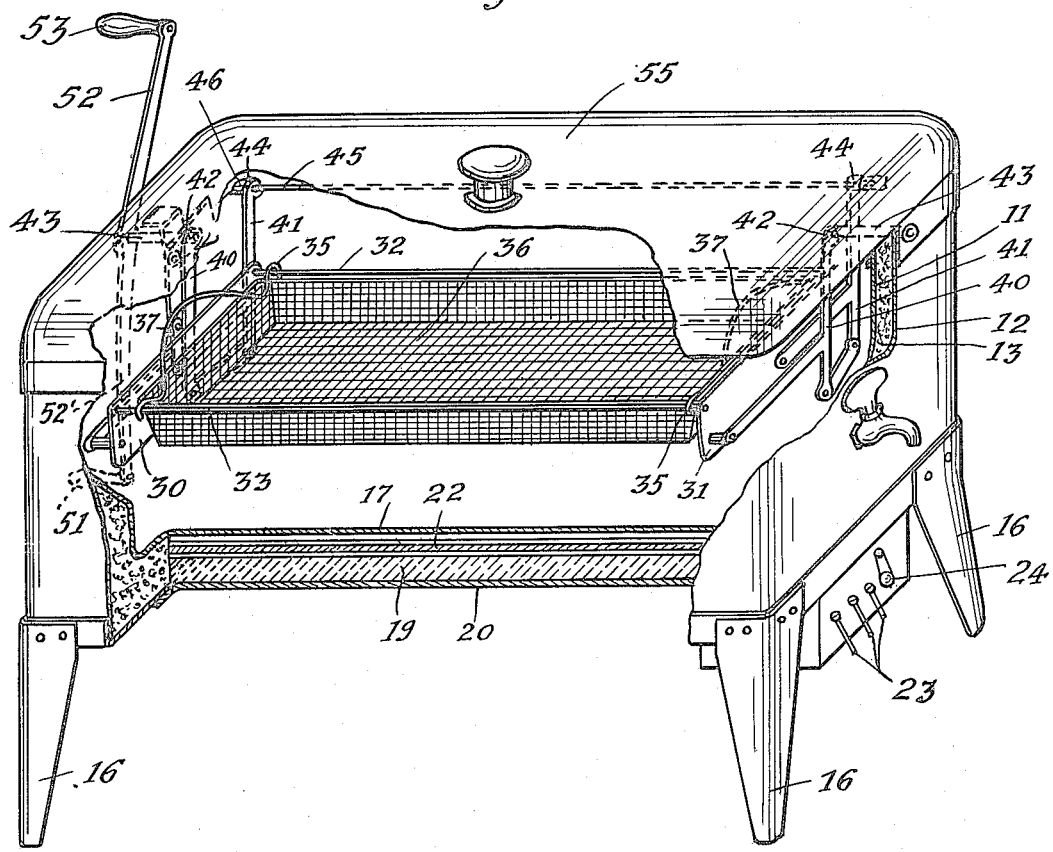

Patented Jan. 1, 1924.

1,479,236

UNITED STATES PATENT OFFICE.

JAY A. HEIDBRINK, OF MINNEAPOLIS, MINNESOTA.

STERILIZER.

Application filed July 23, 1919. Serial No. 312,738.

*To all whom it may concern:*

Be it known that I, JAY A. HEIDBRINK, a citizen of the United States, residing at Minneapolis, in the county of Hennepin and State of Minnesota, have invented certain new and useful Improvements in Sterilizers, of which the following is a specification.

My invention relates to sterilizers, particularly sterilizers of a type adapted to be employed in sterilizing surgical and dental instruments.

It is the object of my invention to provide a device for the purpose which shall be compact, economical, easily heated without loss of heat and which provides means for readily introducing and withdrawing an instrument-holding tray into the heated bath where sterilization takes place. It is a particular object of my invention to provide a flat bottomed tray and so connect the tray that it may be lifted into and out of the tank independently of the cover of the tank or of any element and be rigidly held in a horizontal position at all times. It is a further object of my invention to provide such a tray having lifting means as aforesaid so arranged in conjunction with the cover that when the cover is open the tray when fully withdrawn from the tank will be positioned above the cover.

It is a further object of my invention to provide a detachable connection between the tray and the cover whereby the lifting of the tray will automatically operate to lift the cover, but wherein the operation of the cover and of the tray may be entirely independent.

It is a further object of my invention to provide improved mechanism for operating and lifting the tray such that the actuating means whether for withdrawing the tray or restoring it will always operate under an impulse downward, whereby the tendency to slide the device when the same is resting upon a smooth surface will be avoided.

It is a further object of my invention to provide a cover for the tank with a flat interior surface so related to the tank and the tray that when the cover is open and the tray withdrawn from the tank any water which may drip from the tray will be drained directly upon the cover and into the tank.

The full objects and advantages of my invention will appear in connection with the detailed description thereof and are particularly pointed out in the claims.

In the drawings, illustrating the application of my invention in one form,—

Figure 2:
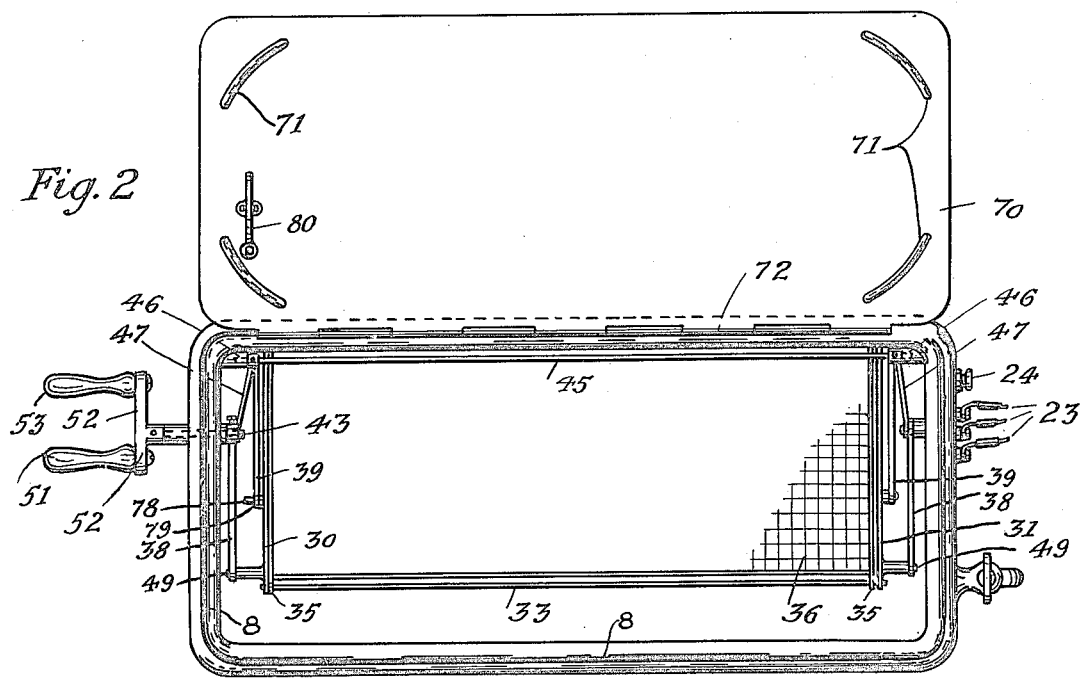
Figure 3:
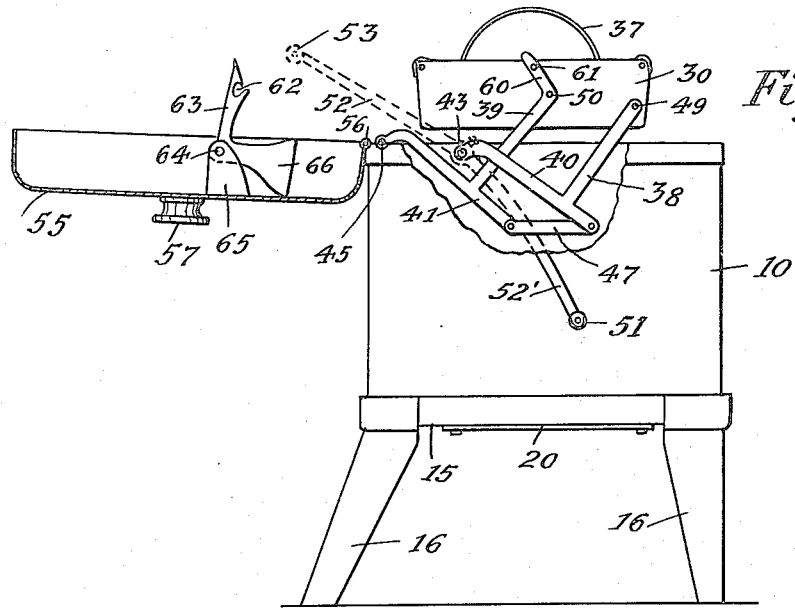
Figure 4:
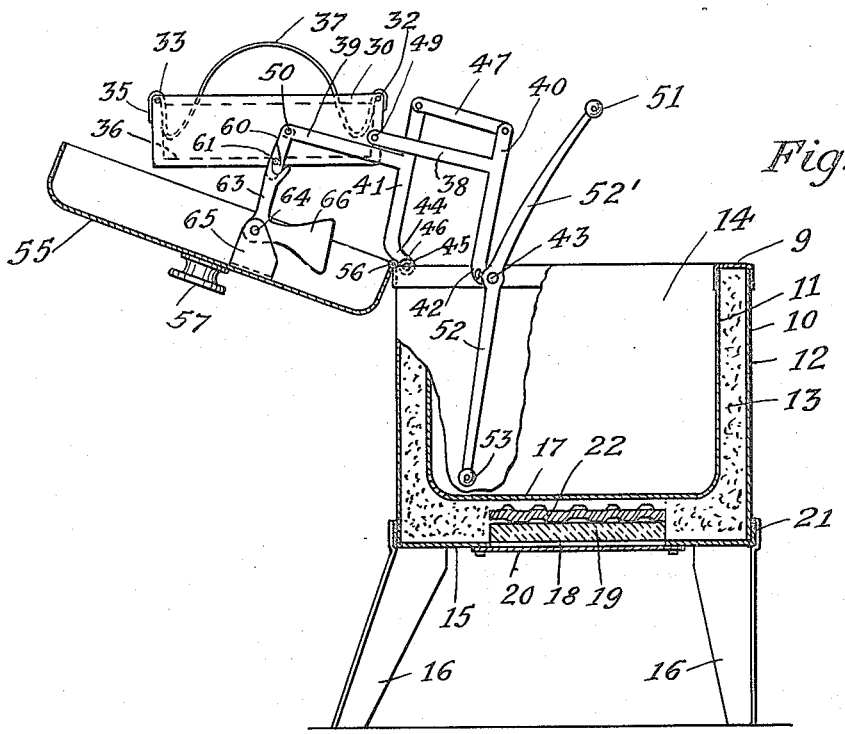

Fig. 1 is an end elevation with some parts broken away and in section of a preferred embodiment of my invention, showing in dotted lines the cover and tank mechanism fully open. Fig. 2 is a plan of a part shown in Fig. 1 with the cover in open position and the tray within the tank. Figs. 3 and 4 are end elevations partly in section of a tank embodying my invention with a modified form of cover and trip mechanism. Fig. 5 is a part perspective view with some parts in section showing particularly the tank and heater mechanism.

The tank body 10 comprises an inner wall 11 and outer wall 12 with an intervening filling 13 of mineral wood or other insulating material providing an interior chamber 14. The body portion 10 is formed from a single piece of metal stamped and pressed into the required shape. The top edge of the main body portion 10 may be formed in a single horizontal plane throughout, as indicated at 9 in Fig. 4, but in the preferred form this top edge is slanted inwardly and provided with a depression or groove 8 extending entirely around the top of the tank body, as best shown in Figs. 1 and 2. A bottom plate 15 having secured thereto legs 16 supports the tank body 10. The plate 15 is spaced from the bottom wall 17 of the chamber 14 and is cut out as indicated at 18. Through the cut-out portion a fire brick 19 is inserted which is held in position by a plate 20 secured to the bottom 15. The bottom plate 15 preferably has flanges 21 which surround the tank portion 10. The mineral wool 13 is brought up to the sides of the fire brick 19 as indicated, and upon the top of the fire brick 19 and just below the wall 17 are positioned electrical heating elements 22 which are adapted to be connected with a source of electrical supply as indicated at 23, the current being controlled by a switch indicated at 24. The material of which the tank 10 is composed is preferably sheet metal and a good conductor of heat such as copper so that the heating element placed above the fire brick and in close contiguity to the bottom 17 will quickly heat and boil water within the chamber 14. A tray frame is formed of end pieces 30, 31 and connecting rods 32, 33 upon which is removably hung by means of hooks 35 a flat-bottomed wire tray 36, as most clearly shown in Fig. 1. Handles 37 facilitate the removing and replacement of the wire tray upon the frame. The rods 32, 33 are rigidly connected with the end pieces 30, 31 and each of these end pieces is supported in a manner which will now be described. To each of the ends 30, 31 is pivotally connected a pair of lever arms 38, 39 of the same length to the points where said levers join cross levers 40, 41. The cross lever 40 has a bent portion 42 which is rigidly connected at its end to a shaft 43 extending through and journaled in the upper portion of the end wall of the tank 10 as shown in Fig. 2. The cross arm 41 likewise is connected to an arm 44 fast on a rod 45 which is journaled in studs or brackets 46 fast on the top of a side wall of the tank body 10. The members 40, 41 are further connected at their outer ends by the links 47. The pivots 43 and 45 are the same distance apart as the pivots 49 and 50 by which sets of levers 38 and 39 are connected to the end bars 30 and 31. Furthermore, the distance between pivot points 43 and 49 is equal to the distance between pivot points 45 and 50. The four pivot points 43, 45, 49 and 50 are therefore at the corners of a parallelogram and levers 40 and 41 are constrained to move in unison by the connecting links 47. The connection of the frame end pieces 30 and 31 with the levers 38 and 39 is such as to hold the frame and the tray therein horizontal. It follows therefore that in any position of the supporting lever system the tray will be held horizontal. The shaft 43 is extended through a bearing formed in conjunction with an end wall of the tank 10 and has secured thereto a lever 52′ with a handle 51 and a second lever 52 with a handle 53, the levers 52′, 52 preferably being formed in a single curved member as shown rigidly connected to shaft 43 at a point near the middle of said member. By pressing down on the handle 53 when the parts are in closed position the lever system will be actuated to lift the frame members and the tray 36 from the sterilizing bath, carrying it horizontally first to the position shown in Fig. 3 and thereafter to the position shown in Figs. 1 and 4, where it overlies the cover 55 of the tank. In all of its positions the tray 36 is carried horizontal In the position of Figs. 1 and 4 the tray carrier and the tray supported thereon are at rest, and to bring them back into the tank requires that they be lifted in very much the same manner that these parts are lifted when the tray is withdrawn from the tank. An attempt to operate the handle 53 to lift the tray and swing it back into the tank would have the result of sliding the tank structure upon a polished or glass surface such as this apparatus ordinarily rests upon. As the cover at least will be quite hot and it is desirable not to have to handle the mechanism, this sliding movement is objectionable, since it practically would necessitate holding the tank with the hand as the tray is actuated to return. I have discovered that by making the second handle this sliding movement is entirely obviated. As shown in Fig. 4 the handle 51 is in the upper position, so that by merely pressing downwardly upon this handle the tray may be thrown back into the tank without causing the device to have any tendency to slide upon its supporting surface.

A cover 55 may be formed as shown in Figs. 3 and 4 in the usual manner with a recessed interior. This cover is hinged to the side of the tank member 10 as indicated at 56, and is adapted to be operated entirely independent of the tray by means of a handle 57. In some instances it may be desirable to open the cover by the same mechanism which lifts the tray out of the tank. To effect this I have provided an extension 60 to the lever 39, which extension has thereon a stud 61 adapted to come into a notch 62 on a trip arm 63 which is pivoted at 64 to a piece 65 fast on the inside of cover 55. A weight 66 on the trip 63 holds it by gravity in such position that when the cover is closed it will be directly above the notch 62. If therefore the handle 52 is actuated before the cover 55 is raised the stud 61 will come into the notch 62 and through the catch lever 63 the cover 55 will be raised or lowered with the tray 36.

The preferred form of cover is the one shown in Fig. 1. This comprises a bottom wall 70 flat in form excepting for such ornamentation as may be desired, indicated at 71. The cover plate 70 is hinged at 72 and the hinge thereof enters the recessed portion 8 in one of the side walls of the top of the tank body 10. A beading 73 on the other edges of the cover member 70 gives an appearance uniform with the hinged portion and enters the depression 8 with the result that when the cover is closed as shown in Fig. 1 the hinge 72 and the beading 73 are seated in the recess 8 and give an ornamental effect. A primary object of this arrangement, however, is to effect drainage directly into the tank from the tray-holding mechanism indicated in dotted lines as being positioned above the flat interior surface 70 of the cover member. Preferably an expanded top 74 is applied to the flat plate 70, which completes the finished appearance of the device and provides an air space 75 above the member 70, thereby insulating the cover and preventing loss of heat on the one hand and a relatively cool surface on the other. When the cover is turned into the dotted-line position a portion of top 74 or any other stop member which may be desired will engage the upper edge of the top wall of the tank member, as indicated at 76, and hold the member 70 in a slanting position adapted to receive the drip from the tank and tray and drain it back into the tank. The stud or boss 49 engaging the arm 39 will also limit movement of the boss.

A preferred form of device for elevating the cover in conjunction with the tank, where that is desirable, and at the same time permitting the cover to be independent, is shown in Fig. 1. This consists of a cam member 77 adapted to engage a cam roller 78 on an arm 79 extended outwardly from the end of lever member 39, the cam member 77 being attached to the inside of cover plate 70. A second cam member 80 is spaced from cam member 77, as indicated at 81, a sufficient distance to permit roller 78 to pass between them. When the tray-actuating mechanism is operated to lift the tray the roller 78 engages the cam member 77 and pushes the cover up with it, said roller passing into the space 81 so that after the cover has passed its center of gravity in its backward swing the cam member 80 will engage the roller 78 and hold the cover to move with the tray-operating mechanism. Also, when the tray-operating mechanism is actuated to return the tray into place the roller 78 will engage cam member 80 and lift the cover so as to restore it with the tray. At the same time it will be seen that cam member 80 is of such length that the cover 70 is at all times free to be operated independently of the tray-operating mechanism.

The advantages of my invention are apparent and have in the main been pointed out in connection with the detailed description of the construction. The formation of the receptacle for the water with insulating walls and a thin readily heat-conducting bottom in conjunction with the electrical heating element provides a means of quickly boiling the sterilizing fluid whether water or other fluid with a minimuum expenditure of electrical energy. An object of primary importance in the device is the arrangement of the tray-operating mechanism whereby a flat-bottomed tray may be conveniently immersed in and withdrawn from the water of the tank and at all times be held with its bottom horizontal. With this tray out of the tank the instruments may be positioned upon the flat bottom thereof out of contact with one another and where they may be conveniently inspected. Then the operation of the tray-holding mechanism will cause the tray to be moved into the tank and immersed into the hot liquid with the bottom horizontal at all times, so that the instruments are not disturbed from the position in which they are placed. The fact that the cover may readily be lifted without disturbing the tray so that the condition of the fluid may be inspected and that the instruments or other material on the tray may also be inspected, while at the same time the cover may if desired be moved with the tray, is another feature of marked advantage in my construction. The tray although held with its flat bottom horizontal is actually projected entirely outside and to one side of the tank receptacle and above the cover portion. A feature of particular advantage is the arrangement of a flat inside to the cover and grooved top to the receptacle together with means for holding the cover in a slanting position with the tray above the same so that any drip from the tray is drained directly back into the tank and under no circumstances can any water fall outside of the tank. This is a matter of very great value, since a device of this character is ordinarily employed in connection with furniture having a varnished surface or surface of other character such as to make it undesirable to have hot water spilled upon it. The hinge construction of the cover, as clearly shown in Figs. 1 and 2, is of such a construction that the drainage from the cover will flow entirely over the edge 46 of the receptacle and upon the groove or depression 8 from which it will pass to the inside of the receptacle, thus insuring that no water at any time will drip upon such a varnished surface.

I claim:

1. A sterilizer for surgical instruments comprising a receptacle, a cover for said receptacle hingedly connected to one side of the receptacle so that when the cover is open it will be held extended laterally outward from the receptacle, an instrument-holding tray, means for holding the tray within the receptacle or above the cover and for moving the tray from one position to the other, said means operative to positively hold the tray horizontal at all times.

2. A sterilizer comprising a receptacle, an instrument-holding tray, means including a lever system for holding the tray within the receptacle or outside of the receptacle, and a pair of handles for operating said lever system, said handles being so connected therewith that movement of the tray from either of its positions to the other position is always effected by downward pressure upon one or the other of said handles.

3. A sterilizer for surgical instruments comprising a receptacle, a cover for said receptable having a flat inner drainage surface, an instrument-holding tray within the receptacle, and means for moving the tray and lifting the cover simultaneously so as to bring the tray above the drainage surface of the cover whereby any drip from the tray will be directly drained back into the tank.

4. A sterilizer for surgical instruments comprising a receptacle, a cover for said receptacle having a flat inner drainage surface, an instrument-holding tray within the receptacle, a lever system for supporting said tray and moving it out of the receptacle and to one side thereof, and means associated with said lever system for causing the cover to be lifted thereby and be carried to one side so that the flat drainage surface thereof will underlie the tray and carry any drip from the tray back into the receptacle.

5. A sterilizer for surgical instruments comprising a receptacle, a cover for said receptacle having a flat inner drainage surface, an instrument-holding tray within the receptacle, a lever system for supporting said tray and moving it out of the receptacle and to one side thereof, a slotted cam member on the inner surface of said cover, and an arm connected with said lever system having a roller in the slot of said cam member for causing said cover to be lifted by the lever system and carried to one side so as to underlie the tray when in its elevated position to cause any drip from the tray to drain back into the receptacle.

In testimony whereof I hereunto affix my signature.

JAY A. HEIDBRINK.